United States Patent
Nomura et al.

(10) Patent No.: US 8,490,379 B2
(45) Date of Patent: Jul. 23, 2013

(54) GAS TURBINE CONTROL DEVICE

(75) Inventors: Masumi Nomura, Yokohama (JP); Kozo Toyama, Takasago (JP); Tomo Kawakami, Takasago (JP); Kotaro Miyauchi, Takasago (JP); Kuniharu Fujibayashi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 163 days.

(21) Appl. No.: 12/933,963

(22) PCT Filed: Apr. 10, 2009

(86) PCT No.: PCT/JP2009/057708
§ 371 (c)(1),
(2), (4) Date: Nov. 18, 2010

(87) PCT Pub. No.: WO2010/061646
PCT Pub. Date: Jun. 3, 2010

(65) Prior Publication Data
US 2011/0056180 A1    Mar. 10, 2011

(30) Foreign Application Priority Data
Nov. 28, 2008  (JP) ................................ 2008-304991

(51) Int. Cl.
*F02C 9/00*  (2006.01)

(52) U.S. Cl.
USPC ..................... 60/39.281; 60/39.23

(58) Field of Classification Search
USPC ............... 60/39.23, 39.27, 39.281, 238, 240, 60/243, 773
See application file for complete search history.

(56) References Cited

U.S. PATENT DOCUMENTS

| 4,716,719 A | * | 1/1988 | Takahashi et al. | ............. 60/773 |
| 7,610,746 B2 | | 11/2009 | Fujii et al. | |

(Continued)

FOREIGN PATENT DOCUMENTS

| CN | 1032840 A | 5/1989 |
| CN | 1052170 A | 6/1991 |

(Continued)

OTHER PUBLICATIONS

International Preliminary Report on Patentability (Form PCT/IB/373) of International Application No. PCT/JP2009/057708 dated May 31, 2011, with Form PCT/ISA/237.

(Continued)

*Primary Examiner* — Phutthiwat Wongwian
(74) *Attorney, Agent, or Firm* — Westerman, Hattori, Daniels & Adrian, LLP

(57) ABSTRACT

A gas turbine controller having a first generator for setting the flow rate of fuel or air being supplied to a combustor in correspondence with a target load, a sensor for detecting intake temperature of a compressor, a second generator for setting a correction amount of a set value of fuel flow rate or air flow rate based on the value detected by the sensor, a third generator for setting a modification amount of the correction amount while taking account of the target load, a first multiplier for operating a modified correction amount from a correction amount set by the second generator and a modification amount set by the third generator, and a second multiplier for calculating the flow rate of fuel or air being supplied to a combustor by adding the modified correction amount to the set value of fuel flow rate or air flow rate.

9 Claims, 5 Drawing Sheets

U.S. PATENT DOCUMENTS

| | | | |
|---|---|---|---|
| 7,756,626 B2 * | 7/2010 | Fujii et al. | 701/100 |
| 2004/0045275 A1 | 3/2004 | Tanaka | |
| 2005/0107942 A1 | 5/2005 | Nomura et al. | |
| 2006/0005526 A1 * | 1/2006 | Tanaka et al. | 60/39.27 |
| 2007/0079593 A1 * | 4/2007 | Fujii et al. | 60/39.27 |
| 2007/0089395 A1 | 4/2007 | Fujii et al. | |
| 2010/0198419 A1 * | 8/2010 | Sonoda et al. | 700/290 |

FOREIGN PATENT DOCUMENTS

| | | |
|---|---|---|
| CN | 1487181 A | 4/2004 |
| CN | 1611839 A | 5/2005 |
| CN | 1932264 A | 3/2007 |
| EP | 0 313 503 A2 | 4/1989 |
| EP | 0 401 152 A2 | 12/1990 |
| JP | 46-043569 B1 | 12/1971 |
| JP | 5-187271 A | 7/1993 |
| JP | 11-022490 A | 1/1999 |
| JP | 2007-077866 A | 3/2007 |
| JP | 2008-025910 A | 2/2008 |

OTHER PUBLICATIONS

International Search Report of PCT/JP2009/057708, mailing date Jul. 21, 2009.

Chinese Office Action dated Dec. 7, 2012, issued in corresponding Chinese Patent Application No. 200980112447.5 (8 pages).

* cited by examiner

PRIOR ART

GAS TURBINE CONTROL DEVICE

FIELD OF THE INVENTION

The present invention relates to a gas turbine control device that controls a gas turbine so that the gas turbine can maintain stable combustion without combustion vibrations even in a case where the ambient temperature, the fuel content, or the fuel calorific, value changes in the gas turbine plant in which the gas turbine is operated.

BACKGROUND OF THE INVENTION

There are several types of combustion nozzles provided in a combustor of a gas turbine; for instance, there are a main nozzle that is used for premix combustion and a pilot nozzle that is used for diffusion combustion; further, a certain combustor is provided with a top-hat nozzle that is used for NOx reduction during high load operation as well as combustion stability during low load operation. An example of the configuration as to such a combustor is disclosed, for instance, in the patent reference 1 (JP2008-25910); the disclosed configuration as to the combustor in the patent reference 1 is hereby explained in consultation with FIGS. 6 and 7.

Within the outer casing 102 of the combustor 100, the inner tube 104 of the combustor is anchored to the outer casing so that the inner tube is supported by the outer casing and a predetermined space is kept between the outer casing and the inner tube; the tail pipe 106 of the combustor is connected to the tip end side of the inner tube 104 so that a casing of the combustor is formed. In the middle center area of the inner casing 104, the pilot nozzle 108 is arranged; on the other hand, along the hoop direction of the inner surface of the inner tube 104, a plurality of main nozzles 110 is arranged so as to surround the pilot nozzle 108. The pilot cone 112 is fitted to the tip part of the pilot nozzle 108. Further, a plurality of top-hat nozzles 114 is arranged along the hoop direction of the inner surface of the outer casing 102.

As shown in FIG. 7, an end part of the outer casing lid part 118 is fastened to the base end part of the outer casing body 116, with a plurality of fastening bolts 120; at another end part of the outer casing lid part 118, the base end part of the inner tube 104 is fitted so that the air passage 122 is formed between the outer casing lid part 118 and the inner tube 104. Further, the tip end part of each main nozzle communicates with the main burner 124.

The top-hat forming part 126 is fitted into the outer casing lid part 118, being fastened to the outer casing lid part 118 with a plurality of the fastening bolts 128. As shown in FIG. 7, the top-hat nozzles 114 are configured in the top-hat forming part 126; namely, a plurality of fuel cavities 130 is formed along the hoop direction of the top-hat forming part 126; a plurality of first fuel passages 132 is formed from each cavity toward the outer casing lid part 118. At the front end of each first fuel passage 132, a second fuel passage 134 is formed toward the air passage 122; each second fuel passage 134 is connected to a peg 136 that is fitted to the inner surface of the top-hat forming part 126.

A pilot fuel line (not shown) is connected to the fuel port 138 for the pilot nozzle 108 and supplies pilot fuel $f_p$ into the combustor; a main fuel line (not shown) is connected to the fuel port 140 for the main nozzles 110 and supplies main fuel $f_m$ into the combustor; a top-hat fuel line (not shown) is connected to the fuel port 142 for the top-hat nozzles 114 and supplies main fuel $f_t$ into the combustor.

In the configuration described above, when the compressed air of a high temperature and a high pressure is supplied from the airflow channel 144 toward the air passage 122 along the direction of the arrow a, the compressed air is premixed with the fuel $f_t$ that is injected through the top-hat nozzles 114; the premixed air-fuel mixture streams into the inner side of the inner tube 104.

Inside of the inner tube 104, the air-fuel mixture (being premixed as described above) is further premixed with the fuel $f_m$ that is injected through the main nozzle 110, turning into revolution flow and streaming into the inner side of the tail pipe 106 of the combustor.

Further, the premixed air-fuel mixture is mixed with the fuel $f_p$ that is injected through the pilot nozzle 108 so that the finally premixed air-fuel mixture is ignited by a pilot flame (not shown), is burnt, turns into combustion gas and blows out into the inner side of the tail pipe 106; thereby, a part of the combustion gas blows out into the inner side of the tail pipe 106, accompanying the flame propagation so that the combustion gas diffuses; the combustion gas that diffuses in this way ignites the air-gas mixture that streams from the main nozzles toward the tail pipe 106; thus, the combustion continues. In other words, since the lean air-fuel mixture produced by the fuel from the main nozzles 110 can stably burns thanks to the diffusion frame propagation produced by the pilot fuel that is injected through the pilot nozzle 108, the flame propagation can be prevented from reducing inflammation. Further, the compressed air is firstly mixed with the fuel injected through the top-hat nozzles 114; this approach can bring the reduction of NOx produced in the gas turbine.

In the conventional gas turbine plants, the fuel flow rate and the airflow rate are predetermined on the basis of the generator output (demand power), the ambient temperature and so on; the fine adjustments of the operation conditions as to the gas turbine and the plant thereof are performed in the test operations or the commissioning operation; after commissioning, the gas turbine and the plant thereof are operated on the basis of the fine adjusted operation conditions. According to the conventional control device for the gas turbine plant, however, the operation state conditions cannot respond to, for example, the change of fuel contents during the operation. Accordingly, by the limitation of the ability of the conventional control device, the combustion stability is often hindered or the combustion vibrations are often caused.

In a case where combustion vibrations occur, the vibrations seriously hinder the operation of the gas turbine; hence, it is strongly required to restrain the combustion vibrations of the gas turbine as far as possible, in view of the protection of the plant facility and the enhancement of the plant availability.

The patent reference 2 (JP1993-187271) discloses a control device by which the airflow rate or the fuel flow rate as to the gas turbine combustor is controlled on the basis of the changes regarding the ambient temperature, the ambient humidity, the fuel calorific value and so on. According to the technology of the patent reference 2, in response to the technological requirement as described above, the bias control regarding the airflow rate or the fuel flow rate is made use of in order to improve the robustness for the combustion stability.

In the control means disclosed in the patent reference 2, the airflow rate or the fuel flow rate is uniformly controlled when the bias control is applied; thus, the degree of freedom as to the control is limited; therefore, it is difficult to adjust the airflow rate or the fuel flow rate so that either of the flow rates converges to an optimally controlled value.

SUMMARY OF THE INVENTION

In view of the difficulties in the conventional technologies as described above, the present invention aims at improving the stability of the combustion as well as preventing the combustion vibrations from happening, by enhancing the degree of freedom regarding the control settings in a case where the airflow rate or the fuel flow rate is optimally adjusted in response to the target power output corresponding to the load demanded on the generator in the gas turbine plant.

In order to overcome the difficulties described above, the present invention discloses a gas turbine control device for controlling a fuel flow rate or an airflow rate in response to a target power output of the gas turbine, the fuel and the air being supplied to a plurality of combustors, the device comprising:

a first function generator for establishing the fuel flow rate or the airflow rate, in response to the target power output, the fuel and the air being supplied to each combustor;

a second function generator for establishing a correction value to correct the established fuel flow rate or the established airflow rate on the basis of the suction air temperature detected by a suction air temperature sensor that is provided so as to detect the suction air temperature at an air inlet of the compressor;

a third function generator for establishing an amendment value to amend the established correction value as to the fuel flow rate or the airflow rate, in taking the target power output into consideration;

a first computing element for computing a correction-amendment value by use of the correction value established by the second function generator and the amendment value established by the third function generator;

a second computing element for computing an order fuel flow rate or an order airflow rate by adding the correction-amendment value to the fuel flow rate or the airflow rate either of which is established in the first function generator, the order fuel flow rate or the order airflow rate being used to determine the flow rate as to the fuel or the air to be supplied to the combustor.

In the present invention, the fuel flow rate or the airflow rate is established in response to the target power output; a correction value to correct the established fuel flow rate or the established airflow rate is set by the second function generator, on the basis of the detected value as to the suction air temperature at the air inlet of the compressor. In other words, the present invention pays attention to the suction air temperature as a control variable (parameter) to be used for controlling the fuel flow rate or the airflow rate in order to maintain the stable combustion of the gas turbine.

In the patent reference 2, the ambient air temperature is selected as a control variable; however, the ambient air temperature does not necessarily uniquely correspond to the suction air temperature. Both the ambient air temperature and the suction air temperature are correlated to some extent; the suction air temperature changes in response to the flow speed thereof; the greater the flow speed, the higher the temperature drop of the suction air temperature after being inhaled.

By detecting the suction air temperature that is the temperature of the air inhaled into the gas turbine, rather than by detecting the ambient air temperature, the mass balance (the mass flow balance) and the heat balance as to the gas turbine can be known more correctly. Thus, in order to maintain the combustion stability without being influenced by the changes of weather condition, it is advantageous to use the suction air temperature rather than the ambient air temperature as a state variable (parameter) in relation to the gas turbine control.

Further, in the third function generator, the amendment value to amend the correction value established in the second function generator as to the fuel flow rate or the airflow rate is set in taking the target power output into consideration; thus, the fuel flow rate or the airflow rate can be optimally adjusted in response to the target power output. Accordingly, in comparison with the approach of the patent reference 2, the present invention provides an approach of greater freedom of control thereby combustion vibrations are prevented and stable combustions are maintained.

Further, another preferable embodiment of the present invention is the gas turbine control device, further comprising:

a fourth function generator for establishing a second correction value to correct the fuel flow rate or the airflow rate established in the first function generator, in response to the contents or the calorific value of the fuel;

a fifth function generator for establishing a second amendment value to amend the established second correction value, in taking the target power output into consideration;

a third computing element for computing a second correction-amendment value by use of the second correction value established by the fourth function generator and the second amendment value established by the fifth function generator;

a fourth computing element for computing an order fuel flow rate or an order airflow rate by adding the correction-amendment value and the second correction-amendment value to the fuel flow rate or the airflow rate, the order fuel flow rate or the order airflow rate being used to determine the flow rate as to the fuel or the air to be supplied to the combustor.

As described above, the contents of the fuel or the calorific value of the fuel is also taken into consideration, as a parameter to be used for the control of the gas turbine; based on the parameter, a second correction value to correct the fuel flow rate or the airflow rate is established; further, a second correction-amendment value to amend the established second correction value is set, in taking the target power output into consideration; thus, the second correction-amendment value is computed; based on the second correction-amendment value, an order fuel flow rate or an order airflow rate is determined. Thus, the stable combustion of the gas turbine is maintained without producing combustion vibrations, even in a case where the contents of the fuel, the calorific value of the fuel, or the percentage content of the inert gas included in the fuel fluctuates.

Further, another preferable embodiment of the present invention is the gas turbine control device, wherein a detecting means for detecting the contents or the calorific value of the fuel is provided on the fuel supply main-pipe at the upstream side of the combustor; and, the second correction value is established on the basis of the detected values detected by the detecting means. The contents of the fuel or the calorific value of the fuel can be specified in advance, or can be inputted every time the contents or the calorific value of the fuel changes. However, as described in this embodiment, the contents or the calorific value of the fuel is preferably detected by a detecting means provided on the fuel supply main-pipe. In addition, preferably, there may be an approach in which the calorific value is estimated through the arithmetic calculations by use of the values as to the generator output and the fuel flow rate.

Hence, it becomes not necessary to specify the contents or the calorific value of the fuel in advance; further, the detecting means can detect the contents or the calorific value, even when the value thereof changes during the gas turbine operation; the contents or the calorific value can be detected without stopping the gas turbine operation; thus, the second correction value can be established in response to the changing value as to the contents or the calorific value of the fuel, while the gas turbine is placed under operation.

Further, another preferable embodiment of the present invention is the gas turbine control device, wherein the target power output is a load index with respect to the load demanded on the generator connected to the gas turbine or the temperature of the combustion gas flowing into the combustor; and, to be controlled variable is one of:

the opening of a plurality of fuel flow rate control valves provided on the fuel supply pipes connecting the fuel supply main-pipe with, each combustor;

the attack angle of a plurality of inlet guide vanes provided in the compressor of the gas turbine; or, the opening of the bypass valves provided on each air bypass pipe passing the air compressed by the compressor so that the compressed air bypasses the combustion gas area in each combustor.

As described above, by controlling the fuel flow rate control valves, the inlet guide vanes, or the bypass valves, it becomes easy to adjust the fuel flow rate or the airflow rate; the flow rate of the fuel or the air supplied to each combustor can be properly set in relation to the suction air temperature the contents of the fuel, or the calorific value of the fuel; accordingly, the combustion control can be realized thereby the gas turbine operation is hard to be influenced by the fluctuations regarding the suction air temperature, the contents of the fuel, or the calorific value of the fuel.

Further, another, preferable embodiment of the present invention is the gas turbine control device, wherein the target power output is a load index with respect to the load demanded on the generator connected to the gas turbine or the temperature of the combustion gas flowing into the turbine; and, to be controlled variable is one of:

the pilot fuel ratio that is the percentage ratio of the pilot fuel flow rate to the total fuel flow rate; or, the top-hat fuel ratio that is the percentage ratio of the top-hat fuel flow rate to the total fuel flow rate.

As described above, by controlling the ratio of the pilot fuel flow rate or the top-hat fuel flow rate to the total fuel flow rate, the flow rate of the fuel supplied to each combustor can be properly set without fluctuating the total fuel flow rate, even in a case where the suction air temperature, the contents of the fuel, or the calorific value of the fuel fluctuates; accordingly, the combustion control can be realized thereby the gas turbine operation is hard to be influenced by the change in the load demanded on the generator or the combustion temperature, even in a case where the suction air temperature, the contents of the fuel, or the calorific value of the fuel fluctuates.

As described above, the present invention provides a gas turbine control device for controlling the fuel flow rate or the airflow rate in response to the target power output of the gas turbine, the fuel and the air being supplied to a plurality of combustors, the device comprising:

a first function generator for establishing the fuel flow rate or the airflow rate, in response to the target power output, the fuel and the air being supplied to each combustor;

a second function generator for establishing a correction value to correct the established fuel flow rate or the established airflow rate on the basis of the suction air temperature detected by a suction air temperature sensor that is provided so as to detect the suction air temperature at the air inlet of the compressor;

a third function generator for establishing an amendment value to amend the established correction value as to the fuel flow rate or the airflow rate, in taking the target power output into consideration;

a first computing element for computing a correction-amendment value by use of the correction value established by the second function generator and the amendment value established by the third function generator;

a second computing element for computing an order fuel flow rate or an order airflow rate by adding the correction-amendment value to the fuel flow rate or the airflow rate either of which is established in the first function generator, the order fuel flow rate or the order airflow rate being used to determine the flow rate as to the fuel or the air to be supplied to the combustor.

In this way, the degree of freedom regarding the gas turbine control can be enhanced; further, in response to the target power output, the optimum control regarding the fuel flow rate or the airflow rate can be performed by use of the suction air temperature, as a parameter for the control; thus, even when the weather condition fluctuates, the combustion of the gas turbine can be stably maintained, and combustion vibrations can be prevented.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 1:
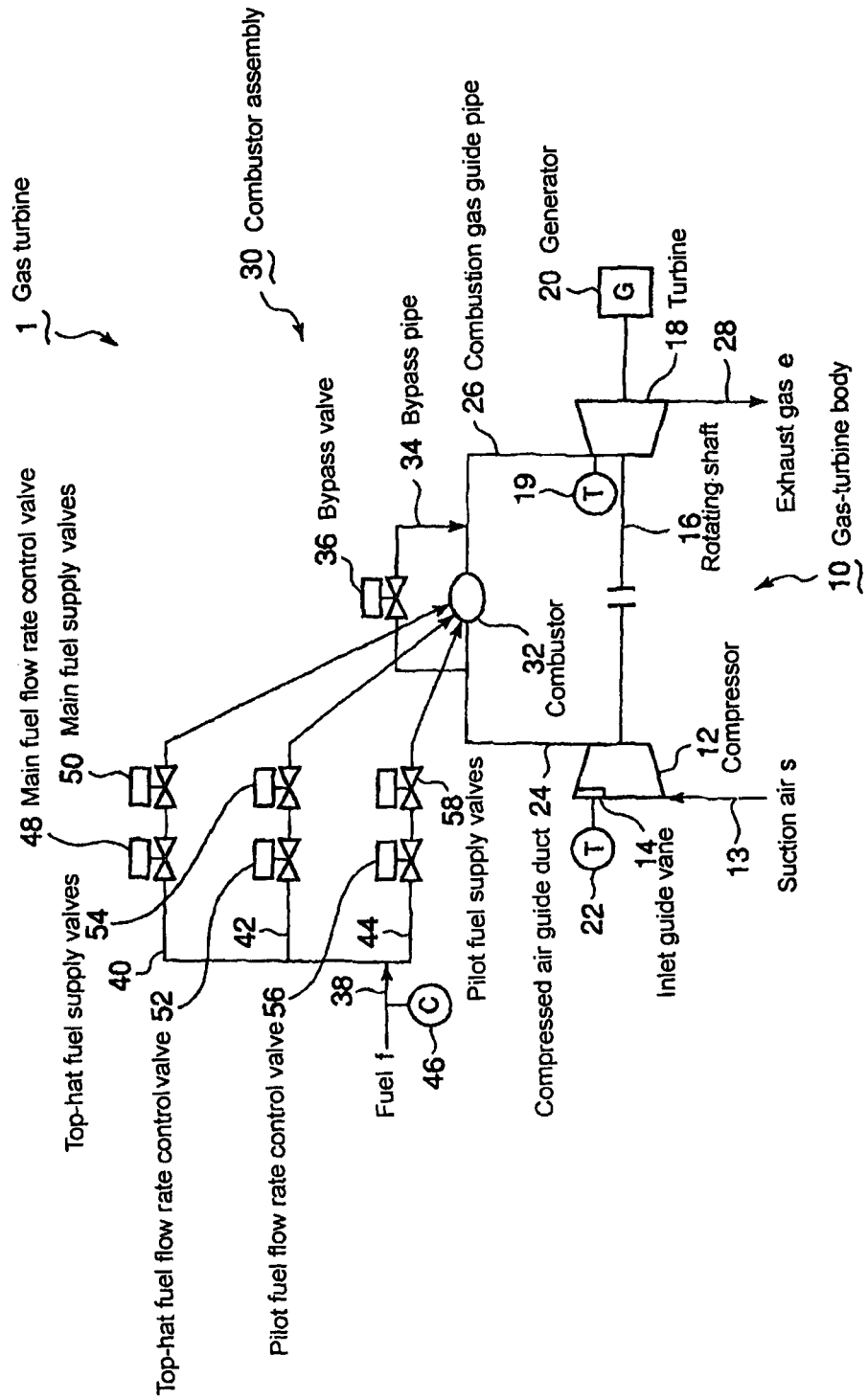
FIG. 1 shows the configuration of the gas turbine plant according to a first embodiment of the present invention.

The device as a first embodiment according to the present invention is now explained with reference to FIGS. 1 and 2. FIG. 1 shows the configuration of the gas turbine plant according to a first embodiment of the present invention. In FIG. 1, a gas turbine 1 is provided with a gas-turbine body 10 and a combustor assembly 30. The gas-turbine body (assembly) 10 is provided with a compressor 12 having a plurality of inlet guide vanes 14, a rotating shaft 16, and a turbine 18; a generator is connected to the turbine 18. A suction air temperature sensor 22 for detecting the temperature of the suction air s passing through the space among the inlet guide vanes 14 is provided; the detected value (signal) detected by the suction air temperature sensor 22 is inputted into a gas turbine control unit 60 for controlling the gas turbine plant according to the present embodiment; incidentally, the explanation about the gas turbine control unit 60 will be given later.

The turbine 18 is connected to a combustion gas guide pipe 26 and an exhaust gas pipe 28 that discharges combustion exhaust gas e outward; Further, the turbine 18 is connected to the compressor 12 and the generator 20 via the rotating shaft 16. The produced combustion gas is supplied to the turbine 18 through the combustion gas guide pipe 26; the exhaust gas rotates the turbine 18; the rotation movement is transmitted to the generator 20 and the compressor 12. The combustion gas that is used for the power generation is discharged outward as the exhaust gas e through the exhaust gas pipe 28. At the combustion gas inlet of the turbine 18, the temperature sensor 19 for detecting the temperature of the combustion gas guided through the combustion gas guide pipe 26 is fitted. The detected value (signal) detected by the temperature sensor 19 is inputted into the gas turbine control unit 60 as described later.

The compressor 12 is connected to an ambient air guide pipe 13 and a compressed air guide duct 24; the compressor 12 is coupled with the turbine 18 and the generator 20 via the rotating shaft 16; the rotation movement of the turbine 18 is transmitted to the compressor 12 and the compressor 12 rotates; by the rotation movement of the compressor 12, the ambient air is inhaled through the ambient air guide pipe 13; the suction air s thus inhaled is compressed and delivered to the combustors.

The inlet guide vanes of the compressor are provided at the passage of the suction air s; the flow rate of the suction air s can be adjusted by adjusting the attack angles of the inlet guide vanes on the condition that the rotation speed of the compressor is constant. The gas turbine control unit 60 controls the attack angle, as described later.

Figure 6:
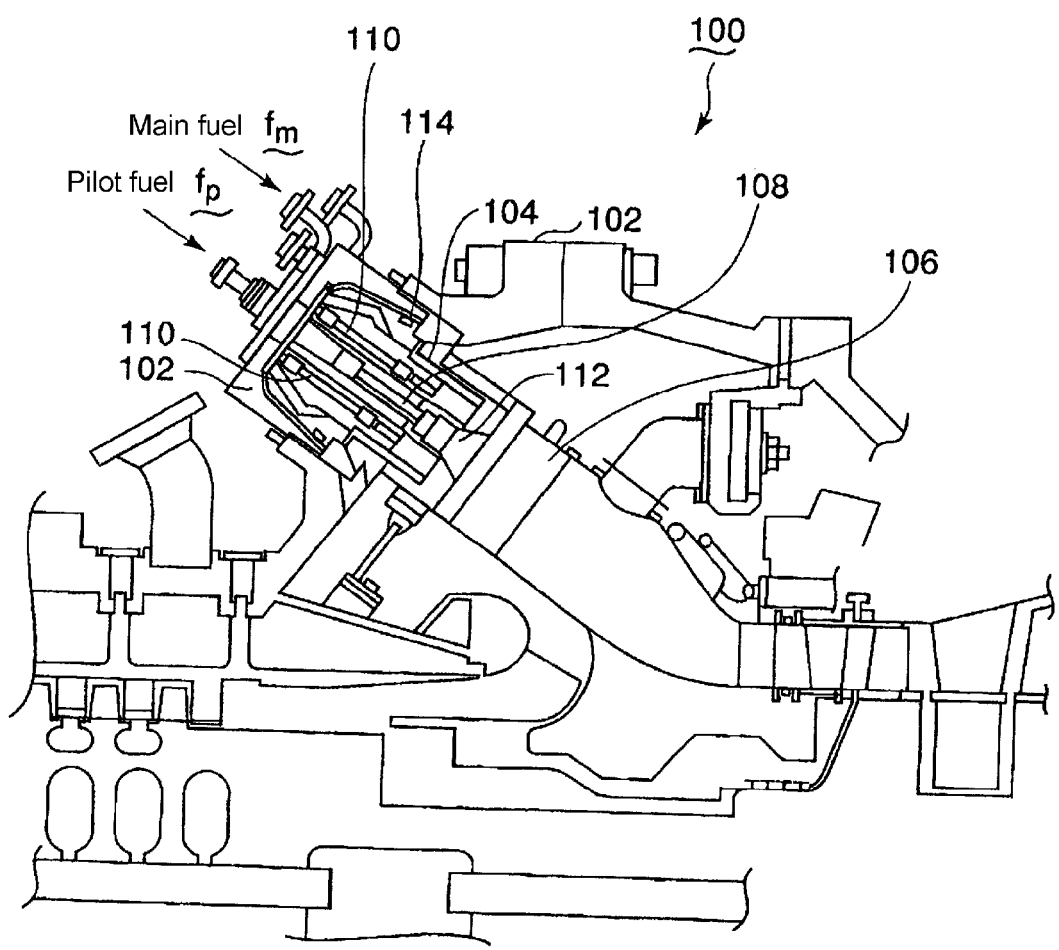
FIG. 6 shows a longitudinal cross-section of the combustor of the gas turbine.

In the next place, the combustor assembly 30 is now explained. The combustor 32 is connected to the compressed air guide duct 24 and the combustion gas guide pipe 26. The configuration of the combustor 32 is the same as that of a combustor assembly 100 shown in FIGS. 6 and 7. The suction air s is guided to the combustor 32 through the compressed air guide duct 24. A bypass pipe 34 is connected to the compressed air guide duct 24 and the combustion gas guide pipe 26; on a part way of the bypass pipe 34, a bypass valve is installed. The bypass valve 36 controls the flow rate of the suction air guided to the combustor 32. The gas turbine control unit 60 controls the opening of the bypass valve, as described later.

The fuel f is supplied to the combustor 32 from a fuel supply main-pipe 38 through three branch pipes 40, 42 and 44; on the fuel supply main-pipe 38, a calorimeter 46 for detecting the calorific value of the fuel f is fitted; at the branch pipe 40, namely, a main fuel supply pipe 40, a main fuel flow rate control valve 48 is installed; between the control valve 48 and the combustor 32, a main fuel supply valve 50 is installed; at the branch pipe 42, namely, a top-hat fuel supply pipe 42, a top-hat fuel flow rate control valve 52 is installed; between the control valve 52 and the combustor 32, a top-hat fuel supply valve 54 is installed; at the branch pipe 44, namely, a pilot fuel supply pipe 44, a pilot fuel flow rate control valve 56 is installed; between the control valve 56 and the combustor 32, a pilot fuel supply valve 58 is installed.

Figure 7:
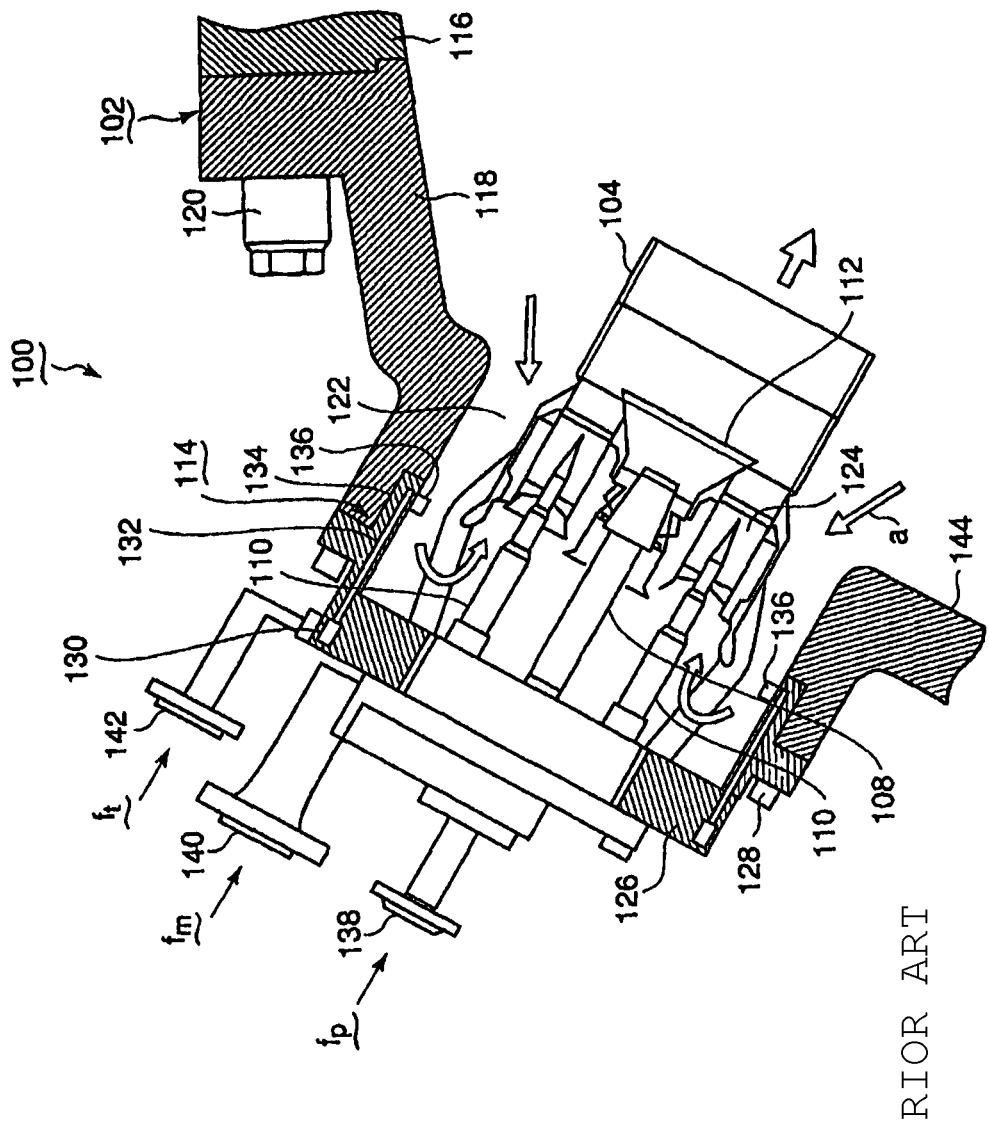
FIG. 7 shows an enlargement of a part of FIG. 6.

In the configuration described thus far, as shown in FIG. 7, the fuel $f_m$ delivered from the main fuel supply pipe 40 is supplied to a fuel port 140 communicating with a plurality of main (fuel) nozzles 110; the fuel $f_t$ delivered from the top-hat fuel supply pipe 42 is supplied to a fuel port 142 communicating with a plurality of top-hat (fuel) nozzles 114; the fuel $f_p$ delivered from pilot fuel supply pipe 44 is supplied to a fuel port 138 communicating with a pilot (fuel) nozzle 108. Thus, the fuel f is burned in the combustor 32 according to the combustion method described above.

Figure 2:
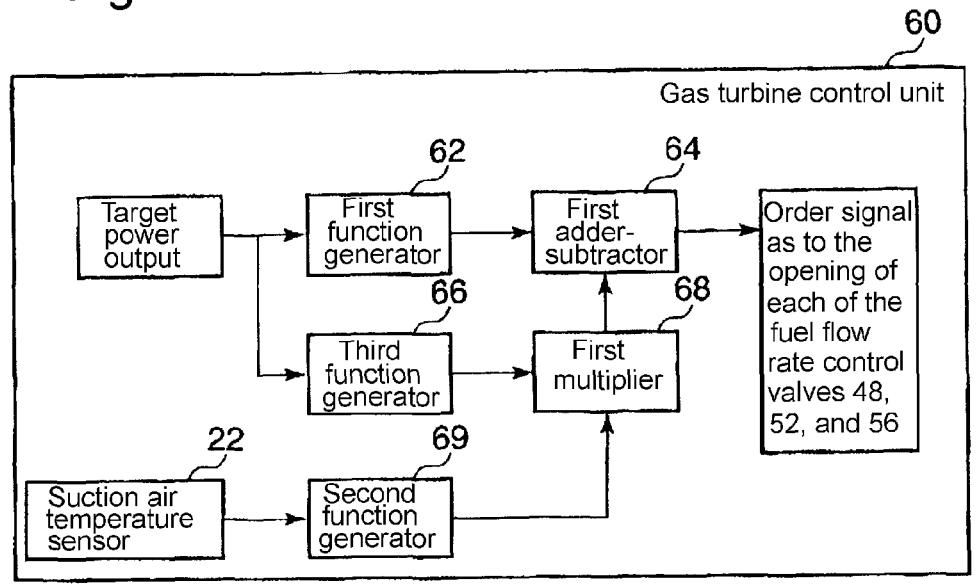
FIG. 2 shows a block diagram regarding a gas turbine control unit according to a first embodiment.

FIG. 2 shows a gas turbine control unit 60 according to the first embodiment; in FIG. 2, the target power output of the gas turbine is specified. The target power output may be a target value corresponding to the load requirement (MW) on the generator or a target value that is specified on the basis of the temperature of the combustion gas guided into the turbine 18. For instance, in a case where the target value corresponding to the load requirement (MW) is used, the target value as the target power output is specified as a non-dimensional value in an interval such as 50% to 100% ([0.5, 1.0]); thereby, the 100% corresponds to full load.

On the basis of the specified target power output, the fuel flow rate as to the fuel flow delivered through the fuel supply main-pipe 38 is specified (established) in a first function, generator 62; the specified value (as to the fuel flow rate) is inputted into a first adder-subtractor 64.

In the next place, the suction air temperature detected by the suction air temperature sensor 22 is inputted into a second function generator 69 in which a correction value (a first correction value) is established in response to the suction air temperature; the correction value established in the second function generator 69 is inputted into a first multiplier 68. In addition, since the combustion state fluctuates according to the target power output, the setting value as to the fuel flow rate needs to be amended under the condition that the combustion state fluctuations are taken into consideration; thus, another target power output (a second target power output) is inputted into a third function generator 66 in which an amendment value (a first amendment value) is established; the amendment value established in the third function generator 66 is inputted into the first multiplier 68.

In the first multiplier 68, a correction-amendment value (an overall correction value for the fuel flow rate setting value) is computed on the basis of the a first correction value established in the second function generator 69 in response to the suction air temperature and the first amendment value established in the third function generator 66 in response to the second target power output; and, the correction-amendment value (the overall correction value for the fuel flow rate setting value) is inputted into the first adder-subtractor 64; in the first adder-subtractor 64, the correction-amendment value is added to (or subtracted from) the fuel flow rate setting value specified in a first function generator 62. Thus, the fuel flow rate in response to the first target power output and the second target power output is determined.

On the basis of the determined fuel flow rate, the opening of each of the fuel valves 48, 52, and 56 is determined according to a function expressed with the parameters as to the valve opening characteristics of each valve as well as the parameters such as fuel temperature and fuel pressure; the order signals for controlling the opening of each of the fuel valves 48, 52, and 56 are issued from the gas turbine control unit 60 toward each of the fuel valves 48, 52 and 56.

As described above, the fuel flow rates through each of the fuel valves 48, 52, and 56 are determined; the opening of each of the fuel valves 48, 52, and 56 can respond to the detected suction air temperature at the air inlet of the compressor 12; further, since the opening of each of the fuel valves is controlled so that the valve opening reflects the combustion characteristics regarding the target power output, the each fuel flow rate can be optimal in response to the target power output. Hence, the operation of the gas turbine can be continued in a stable combustion condition, without combustion vibrations. Moreover, the degree of freedom regarding the control settings can be enhanced, in comparison with the bias control (regarding the airflow rate or the fuel flow rate) disclosed in the patent reference 2.

In addition, in this first embodiment, the fuel flow rate as to the fuel flow delivered through the fuel supply main-pipe 38 is specified by the first function generator 62; the summation of the first correction value and the first amendment value is calculated by the first adder-subtractor 64, and, the fuel flow rate in response to the target power output is determined. However, preferably, there may be an approach in which each of the fuel flow rates through the main fuel supply pipe 40, the top-hat fuel supply pipe, and the pilot fuel supply pipe 42 is specified by the first function generator 62; and, the correction-amendment value (for the summation of the fuel flow rates) is calculated by the first adder-subtractor 64 so that the main fuel flow rate, the top-hat fuel flow rate, and the pilot fuel flow rate are determined in response to the target power output.

Further, in this first embodiment, an approach in which the fuel flow rate is controlled is adopted; instead, preferably, there may be an approach in which the flow rate of the compressed air guided from the compressed air guide duct 24 into the combustor 32 is controlled. In this case, the attack angle of each inlet guide vane 14 is adjusted so as to control the compressed airflow rate; or, the opening of the bypass valve 36 is adjusted so as to control the compressed airflow rate. Further, preferably, there may be an approach in which both the fuel flow rate and the compressed airflow rate are controlled at the same time.

Further, in this first embodiment, at the inlet of the turbine 18, the temperature sensor 19 for detecting the temperature of the combustion gas is provided. However, preferably, there may be an approach in which the temperature of the combustion gas is estimated through arithmetic calculations as to the detected-values detected by other temperature sensors and flow rate meters, with respect to heat balance and mass balance.

Second Embodiment

Figure 3:
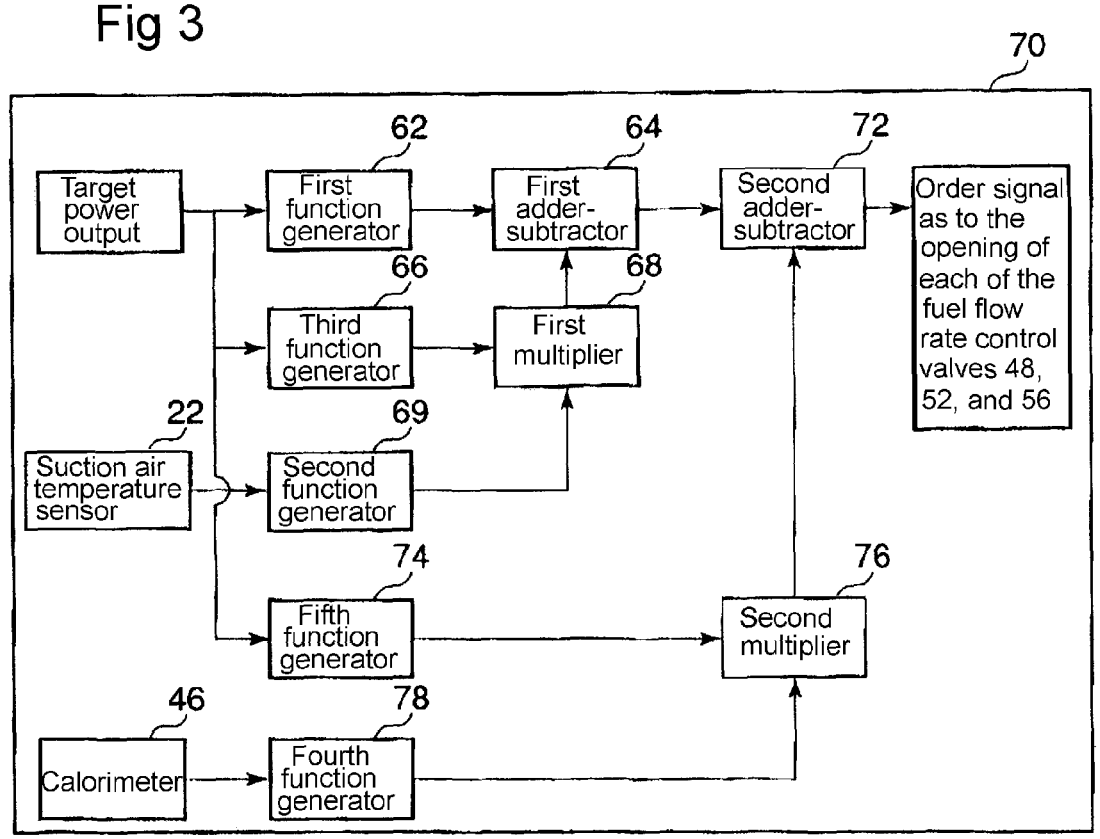
FIG. 3 shows a block diagram regarding a gas turbine control unit according to a second embodiment of the present invention.

In the next place, a second embodiment according to the present invention is now explained with reference to FIG. 3. In FIG. 3, the components (such as the function generators, the adder-subtractors or the multipliers) that are marked with the same numeral or symbol, as the components in FIG. 2 in relation to the first embodiment are common components over FIGS. 2 and 3; naturally, the common components have the same function. In this second embodiment, in addition to the control approach shown in FIG. 2, a calorimeter 46 is provided on the fuel supply main-pipe so as to detect the specific heat value of the fuel f; and, in response to the detected-value detected by the calorimeter 46, a second correction value is established in a fourth function generator 78, the second correction value being a correction value for the setting of the fuel flow rate. Further, in a fifth function generator 74, a second amendment value for amending the second correction value in consideration of the target power output (the first target power output) is established.

In the next place, the second correction value established in the fourth function generator 78 and the second amendment value established in the fifth function generator 74 are inputted into a second multiplier 76, in which a second correction-amendment value is calculated. The second correction-amendment value is inputted into a second adder-subtractor 72. Further, as is the case with the first embodiment, in the first adder-subtractor 64, the first correction-amendment value is added to (or subtracted from) the fuel flow rate setting value specified in the first function generator 62 in response to the target power output; subsequently, in a second adder-subtractor 72, the second correction-amendment value is added to (or subtracted from) the first correction-amendment value. Thus, the flow rate of the fuel supplied to the combustor 32 is determined; based on the determined fuel flow rate, the opening of each of the fuel valves 48, 52, and 56 is to be determined according to a function expressed with the parameters as to the valve opening characteristics of each valve as well as the parameters such as fuel temperature and fuel pressure.

According to this second embodiment, the detected calorific value of the fuel f is taken into consideration as a parameter of an additional kind. On the basis of the detected suction-air temperature at the inlet of the compressor and this detected calorific value of the fuel, the fuel flow rate setting value is corrected; further, the corrected value is amended in response to the target power output; thus, in addition to the effect brought by the first embodiment, the second embodiment can realize the effectiveness of maintaining the stable combustion without producing combustion vibrations, even in a case where the contents of the fuel, the calorific value of the fuel, or the percentage content of the inert gas included in the fuel fluctuates.

Further, in this first embodiment, an approach in which the fuel flow rate is controlled is adopted; instead, preferably, there may be an approach in which the flow rate of the compressed air guided from the compressed air guide duct 24 into the combustor 32 is controlled. In this case, the attack angle of each inlet guide vane 14 is adjusted so as to control the compressed airflow rate; or, the opening of the bypass valve 36 is adjusted so as to control the compressed airflow rate. Further, preferably, there may be an approach in which both the fuel flow rate and the compressed airflow rate are controlled at the same time. Moreover, in this first embodiment, the calorimeter 46 is provided on the part way of the fuel supply main-pipe. However, preferably, there may be an approach in which the calorific value is estimated through the arithmetic calculations by use of the values as to the generator output and the fuel flow rate.

Third Embodiment

Figure 4:
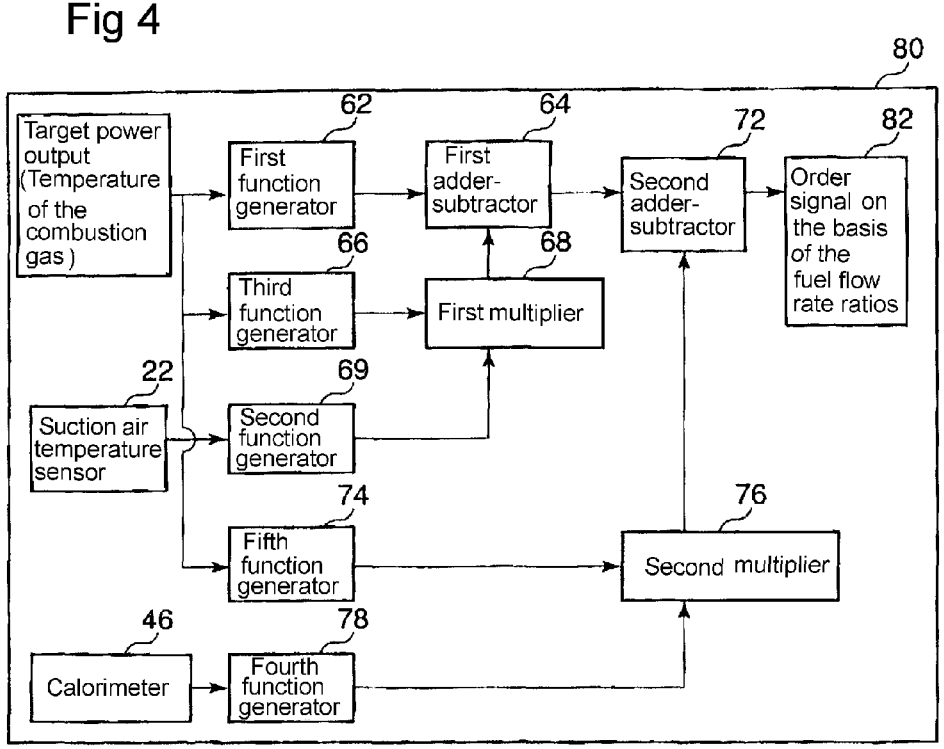
FIG. 4 shows a block diagram regarding a gas turbine control unit according to a third embodiment of the present invention.
Figure 5:
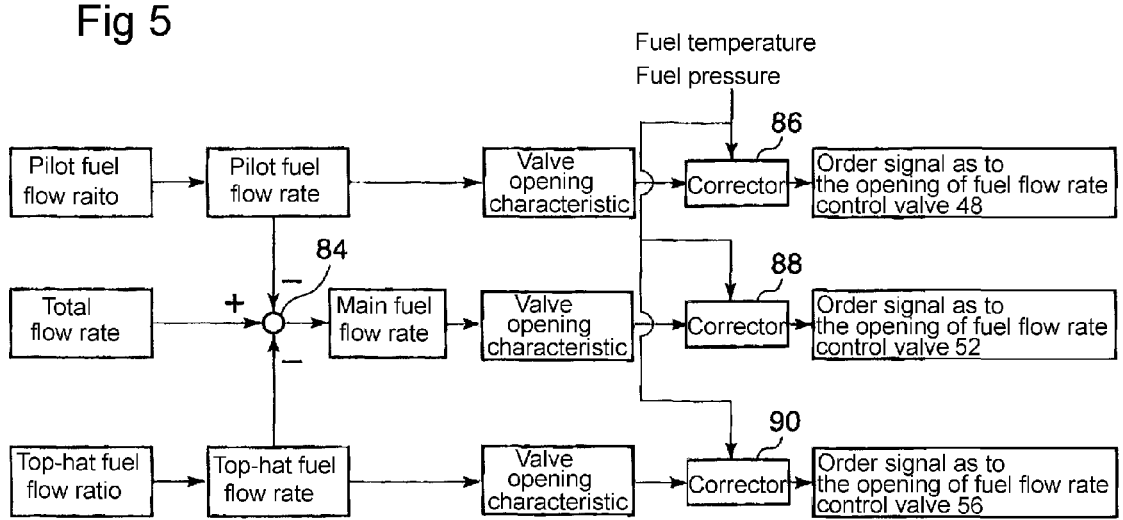
FIG. 5 shows a block diagram regarding the control mechanism of the fuel flow rate control valves according to the third embodiment.

In the next place, a third embodiment according to the present invention is now explained with reference to FIGS. 4 and 5. In FIG. 4 according to the present embodiment, the temperature of the combustion gas at the gas inlet of the turbine 18 is adopted as a variable (parameter) to be established corresponding to the target power output. The temperature sensor 19 detects the temperature of the combustion gas. The gas inlet temperature as an index of the target power output is, for instance, directed to a value between 1480 to 1500° C. In FIG. 4, the configuration components (such as the function generators, the adder-subtractors or the multipliers) of a gas turbine control unit 80 are the same as those in FIG. 3; the common components over FIGS. 3 and 4 are marked with the same numerals or symbols.

In the gas turbine control unit 80, the combustion temperature is used as a variable (parameter) that corresponds to the target power output; as is the case with the second embodiment, the control parameters comprise the suction air temperature detected by the suction air temperature sensor 22 and the calorific value of the fuel f detected by the calorimeter 46; In the present embodiment, the first function generator 62 establishes the fuel ratios that are, for instance, the percentage ratios of the main fuel flow rate, the top-hat fuel flow rate and the pilot fuel flow rate in the total fuel flow rate. In the first adder-subtractor 64, the first correction-amendment value is added to (or subtracted from) each fuel ratio; subsequently, in the second adder-subtractor 72, the second correction-amendment value is added to (or subtracted from) the each result by the first correction-amendment. Incidentally, the ratio of the top-hat fuel flow rate to the total fuel flow rate, the ratio of the pilot fuel flow rate to the total fuel flow rate, and the ratio of the main fuel flow rate to the total fuel flow rate are called the top-hat fuel flow ratio, the pilot fuel flow ratio, and the main fuel flow ratio, respectively.

In this way, on the basis of the determined fuel flow rate ratios, the order signal as to the opening of each of the fuel valves 48, 52, and 56 is issued.

The steps of determining the opening of each of the fuel valves 48, 52, and 56 are on the basis of the determined fuel flow rate ratios are now explained with reference to FIG. 5; thereby, the pilot fuel flow rate is calculated by use of the pilot fuel flow ratio and the total flow rate; the top-hat fuel flow rate is calculated by use of the top-hat fuel flow ratio and the total flow rate; further, at the comparator 84, the main fuel flow rate is calculated by subtracting the pilot fuel flow rate and the top-hat fuel flow rate from the total fuel flow rate.

Subsequently, according to a relation expressed with the parameters as to the valve opening characteristic of each of the fuel flow rate control valves 48, 52 and 56, as well as, the parameters such as fuel temperature and fuel pressure, the order signal for controlling the opening of each of the fuel flow rate control valves 48, 52, and 56 is issued toward the corresponding fuel flow rate control valve; thereby, before being issued, each signal for each corresponding fuel flow rate control valve is corrected, at correctors 86, 88 and 90 (in FIG. 5), so as to reflect the effect of the parameters such as fuel temperature and fuel pressure.

Further, in this third embodiment, at the inlet of the turbine 18, the temperature sensor 19 for detecting the temperature of the combustion gas is provided. However, preferably, there may be an approach in which the temperature of the combustion gas is estimated through arithmetic calculations as to the detected-values detected by other temperature sensors and flow rate meters, with respect to heat balance and mass balance.

According to the this third embodiment, as is the case with the second embodiment, the control parameters comprise the suction air temperature detected by the suction air temperature sensor 22 and the calorific value of the fuel f detected by the calorimeter 46; further, the temperature of the combustion gas at the gas inlet of the turbine 18 is adopted as a variable (parameter) to be established corresponding to the target power output; thus, in addition to the effect brought by the second embodiment, the third embodiment can realize the effectiveness of restraining the influence of the seasonal change in the suction air temperature on the combustion stability inside the combustor, to a minimal level.

INDUSTRIAL APPLICABILITY

According to the present invention, a stable combustion operation of a gas turbine plant can be realized with a simple control mechanism, without producing combustion vibrations, in a case where the suction air temperature changes or the calorific value of the supplied fuel fluctuates, for instance, because of the increase of the inert gas components in the fuel.

The invention claimed is:

1. A gas turbine control device for controlling a fuel flow rate or an airflow rate in response to a target power output of the gas turbine, the fuel and the air being supplied to a plurality of combustors, the device comprising:

a first function generator for establishing the fuel flow rate or the airflow rate, in response to the target power output, the fuel and the air being supplied to each combustor;
a second function generator for establishing a correction value to correct the fuel flow rate or the airflow rate established by the first generator on the basis of the suction air temperature detected by a suction air temperature sensor that is provided so as to detect the suction air temperature at an air inlet of the compressor;
a third function generator for establishing an amendment value to amend the correction value established by the second function generator as to the fuel flow rate or the airflow rate, in taking the target power output into consideration;
a first computing element for computing a correction-amendment value by use of the correction value established by the second function generator and the amendment value established by the third function generator;
a second computing element for computing an order fuel flow rate or an order airflow rate by adding the correction-amendment value to the fuel flow rate or the airflow rate either of which is established in the first function generator, the order fuel flow rate or the order airflow rate being used to determine the flow rate as to the fuel or the air to be supplied to the combustor.

2. The gas turbine control device according to claim 1, the device further comprising:

a fourth function generator for establishing a second correction value to correct the fuel flow rate or the airflow rate established in the first function generator, in response to the contents or the calorific value of the fuel;
a fifth function generator for establishing a second amendment value to amend the second correction value, in taking the target power output into consideration;
a third computing element for computing a second correction-amendment value by use of the second correction value established by the fourth function generator and the second amendment value established by the fifth function generator;
a fourth computing element for computing an order fuel flow rate or an order airflow rate by adding the correction-amendment value and the second correction-amendment value to the fuel flow rate or the airflow rate, the order fuel flow rate or the order airflow rate being used to determine the flow rate as to the fuel or the air to be supplied to the combustor.

3. The gas turbine control device according to claim 2, wherein a detecting means for detecting the contents or the calorific value of the fuel is provided on the fuel supply main-pipe at the upstream side of the combustor; and, the second correction value is established on the basis of the detected values detected by the detecting means.

4. The gas turbine control device according to claim 1, wherein the target power output is a load index with respect to the load demanded on the generator connected to the gas turbine or the temperature of the combustion gas flowing into the combustor; and a control variable used to control the fuel flow rate or the air flow rate in response to the target power output of the gas turbine in order to maintain the stable combustion of the gas turbine by:

opening a plurality of fuel flow rate control valves provided on fuel supply pipes connecting a fuel supply main-pipe with each of the combustor; or
adjusting an attack angle of a plurality of inlet guide vanes provided in the compressor of the gas turbine; or, opening bypass valves provided on each air bypass pipe passing the air compressed by the compressor so that the compressed air bypasses the combustion gas area in each combustor.

5. The gas turbine control device according to claim 1, wherein the target power output is a load index with respect to the load demanded on the generator connected to the gas turbine or the temperature of the combustion gas flowing into the turbine; and wherein the first function generator is configured to control one of:
 a pilot fuel ratio that is a percentage ratio of a pilot fuel flow rate to a total fuel flow rate; and,
 a top-hat fuel ratio that is a percentage ratio of a top-hat fuel flow rate to the total fuel flow rate.

6. The gas turbine control device according to claim 2, wherein the target power output is a load index with respect to the load demanded on the generator connected to the gas turbine or the temperature of the combustion gas flowing into the combustor; and wherein a control variable to control the fuel flow rate or the air flow rate in response to the target power output of the gas turbine in order to maintain the stable combustion of the gas turbine by:
 opening a plurality of fuel flow rate control valves provided on fuel supply pipes connecting a fuel supply main-pipe with each of the combustor; or
 adjusting an attack angle of a plurality of inlet guide vanes provided in the compressor of the gas turbine; or,
 opening bypass valves provided on each air bypass pipe passing the air compressed by the compressor so that the compressed air bypasses the combustion gas area in each combustor.

7. The gas turbine control device according to claim 3, wherein the target power output is a load index with respect to the load demanded on the generator connected to the gas turbine or the temperature of the combustion gas flowing into the combustor; and wherein a control variable to control the fuel flow rate or the air flow rate in response to the target power output of the gas turbine in order to maintain the stable combustion of the gas turbine by:
 opening a plurality of fuel flow rate control valves provided on fuel supply pipes connecting a fuel supply main-pipe with each of the combustor; or
 adjusting an attack angle of a plurality of inlet guide vanes provided in the compressor of the gas turbine; or,
 opening bypass valves provided on each air bypass pipe passing the air compressed by the compressor so that the compressed air bypasses the combustion gas area in each combustor.

8. The gas turbine control device according to claim 2, wherein the target power output is a load index with respect to the load demanded on the generator connected to the gas turbine or the temperature of the combustion gas flowing into the turbine; and wherein the first function generator is configured to control one of:
 a pilot fuel ratio that is a percentage ratio of a pilot fuel flow rate to a total fuel flow rate; and,
 a top-hat fuel ratio that is a percentage ratio of a top-hat fuel flow rate to the total fuel flow rate.

9. The gas turbine control device according to claim 3, wherein the target power output is a load index with respect to the load demanded on the generator connected to the gas turbine or the temperature of the combustion gas flowing into the turbine; and the first function generator is configured to control one of:
 a pilot fuel ratio that is the percentage ratio of a pilot fuel flow rate to the total fuel flow rate; and,
 a top-hat fuel ratio that is a percentage ratio of a top-hat fuel flow rate to the total fuel flow rate.

\* \* \* \* \*